United States Patent [19]
Bernholz

[11] 3,929,699
[45] Dec. 30, 1975

[54] FOG RESISTANT POLYMER COMPOSITIONS

[75] Inventor: William F. Bernholz, Wayne, N.J.

[73] Assignee: PVO International Inc., San Francisco, Calif.

[22] Filed: Jan. 29, 1970

[21] Appl. No.: 6,968

[52] U.S. Cl. ............... 260/23 XA; 106/13; 252/70; 252/356; 260/31.6; 260/33.2 R; 260/92.8 A; 426/415
[51] Int. Cl.² .................. C08K 5/06; C08K 5/10
[58] Field of Search ......... 260/23 XA, 31.6, 33.2 R, 260/92.8 A; 106/13; 252/70, 356; 426/415

[56] References Cited
UNITED STATES PATENTS

| | | | |
|---|---|---|---|
| 2,657,186 | 10/1953 | Klein et al. | 260/23 |
| 2,772,172 | 11/1956 | Carson | 426/415 |
| 3,391,129 | 7/1968 | Sparks | 260/86.7 |
| 3,425,976 | 2/1969 | Adams et al. | 260/23 |
| 3,479,308 | 11/1969 | Gattenby, Jr. et al. | 260/23 |
| 3,541,040 | 11/1970 | Eastes et al. | 260/31.6 |
| 3,542,713 | 11/1970 | Gillio-Tos | 260/23 |
| 3,557,248 | 1/1971 | Kisters | 260/85.7 |
| 3,558,537 | 1/1971 | Hecker et al. | 260/23 |
| 3,738,956 | 6/1973 | Glatti et al. | 260/31.6 |
| 3,795,749 | 3/1974 | Cummin et al. | 426/316 |

Primary Examiner—Donald E. Czaja
Assistant Examiner—R. A. White
Attorney, Agent, or Firm—Owen, Wickersham & Erickson

[57] ABSTRACT

Polymeric vinyl film forming materials and to the films made therefrom, both of which contain a minor amount of an anti-fogging composition that possesses enhanced thermal stability properties, said composition being a combination of (A) a partial ester of a water soluble $C_{2-6}$ polyol with a $C_{6-18}$ aliphatic monocarboxylic acid and (B) an alkoxylated alkylphenol of the formula:

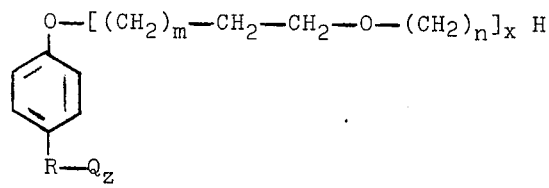

wherein $m$, $n$ and $z$ are numbers from 0 to 1, $x$ is an integer of from 1 to 9 inclusive; R is an alkylene group of 4 carbon atom content, and Q is an alkyl group of from 4 to 8 carbon atom content inclusive.

15 Claims, No Drawings

FOG RESISTANT POLYMER COMPOSITIONS

This invention relates to the prevention of fogging of polyvinyl film surfaces by condensed moisture, and more particularly relates to the prevention of moisture fogging on the surfaces of transparent, self-supporting vinyl films employed in the packaging of moist food products.

Polymer films or sheets are widely used to package food products because of their ease of handling, inherent viewability and elimination of the sanitary problem. Some examples of such films include cellophane, rubber hydrochloride, polypropylene, polyvinyl chloride and various interpolymerns and mixtures of polymers of vinyl halides, acetates, alcohols and acrylates. When polymeric films are used to package food products, and particularly fresh meat products, and the packages are subsequently stored for display in refrigerated units, certain disadvantages become evident. Within temperature ranges normally found in such refrigeration units, about 25° F to 40° F., the depressed vapor pressure of water results in precipitation of fine droplets of moisture on the surfaces of the film. Often, within an hour after being packaged and stored, sufficient water evaporates from the meat surface to saturate the air spaces between the film and the meat, and then begins to condense on the inner surfaces of the polyolefin film as minute droplets of water. As more water droplets form on the inner polyolefin surfaces, an overall fogged effect is produced, interfering with visual identification of the meat or other packaged commodity. The term "fog" is in fact commonly used to describe this occurrence. The presence of fog is particularly objectionable from the point of view of selling the products as it effectively bars the potential customer's view of the item which he seeks to purchase.

An additional requirement of the wrapper film when the food on display is a red meat item such as beef, that it be sufficiently permeable to oxygen as to allow oxidation of the hemoglobins in the blood of fresh red meat in order to have the meat retain its red surface color. The red color is usually required to last up to 3 days at refrigeration temperatures. Insufficient oxygen permeability results in a rapid and undesirable darkening of the meat. However, other food stuffs require less oxygen permeability typically poultry, which does not have the hemoglobin content of red meat, requires less oxygen permeability. Lettuce and other produce require minimal or no oxygen permeability to maintain freshness. The anti-fogging compositions of this invention can be used for vinyl films intended for the protection of any and all types of foodstuffs.

Accordingly, it is an object of the present invention to impart to surfaces of polyvinyl materials resistance to moisture fogging.

A further object is to impart to self-supporting polyvinyl films resistance to moisture fogging.

A further object is to provide melt-extrudable polyvinyl compositions, heat-formable into clear, self-supporting films, and particularly characterized by their resistance to surface fogging by humid atmosphere.

Other objects of the invention will in part be obvious and will in part appear hereinafter.

The invention accordingly comprises the products and compositions possessing the features, properties and the relation of components which are exemplified in the following detailed disclosure and the scope of the application of which will be indicated in the claims.

It has been found that the incorporation of specific amounts of my composition which comprises (A) a partial ester of a water soluble $C_{2-6}$ polyol with a $C_{6-18}$ aliphatic mono carboxylic acid and (B) an alkoxylated alkyl phenol of the formula:

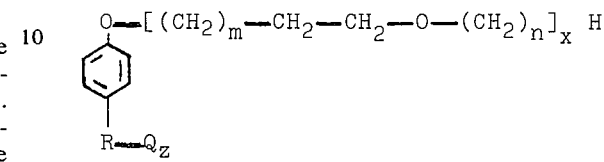

wherein $m$, $n$ and $z$ are numbers of from 0 to 1, $x$ is an integer of from 1 to 9 inclusive; R is an alkylene group of 4 carbon atom content, and Q is an alkyl group of from 4 to 8 carbon atom content inclusive, in a film-forming polyvinyl is unexpectedly effective in causing moisture condensing on the surfaces of film produced therefrom to coalesce into a continuous visually clear film instead of forming a fogged surface comprising individual droplets of water.

The present invention provides a polymeric vinyl film forming or sheet forming material with non-fogging and an increased tendency toward antiblocking properties. Blocking is a characteristic of polymeric films which defines its tackiness or stickiness and is a quality well known in the art. By use of the compositions of the instant invention, the thermal stability of films and sheets prepared from the polyvinyl material are also enhanced.

It is to be understood that other additives such as stabilizers, coloring agents, etc. which are compatible with the instant compositions may also be incorporated into the polyvinyl materials in amounts known in the art.

The antifogging compositions of this invention comprise component (A), the partial ester and component (B), the alkoxylated alkyl phenol.

Partial ester (A) is a partial (such as mono-ester) of a water soluble $C_{2-6}$ polyol which polyol contains at least two alcohol groups. A minimum of one of such alcohol groups are not reacted with acid to form the ester and at least one of such alcohol groups are reacted with acid to form the ester. The polyol component of this partial ester may be glycerol; ethylene, propylene or other $C_{2-4}$ glycols; trimethylol propane, sorbitol; and the like. The acid component may be any $C_{6-18}$ aliphatic monocarboxylic acid, examples of which are lauric, palmitic, oleic, stearic, caproic, caprylic, heptanoic and the like.

The manner for the preparation of component (A) compounds is classically known in the art. However, care should be taken to exclude excess polyol in an unreacted state, whose presence contributes to a greasiness in the filmforming polyvinyl, and further whose presence necessitates the incorporation of higher levels of the antifog composition.

Among the component (A) compounds, mention may be made of glycerol monococate, glycerol monolaurate, glycerol monomyristate, trimethylol propane monococate, glycerol monoheptanoate, sorbitan monooleate, sorbitan monocaprylate, and propylene glycol monolaurate.

Component (B), the alkoxylated alkyl phenol is prepared by direct alkoxylation of alkyl phenols of the desired chain length. These phenols are available in the marketplace from several sources. The alkoxylation procedures utilized by applicants are standard and have been described in the literature. References include U.S. Pat. Nos. 2,161,826 and 2,091,483, J.A.C.S. 62, pp. 994, 1940. The manner of limiting the number of mols of addition of alkylene oxide is also known in the art.

It is to be understood that component (B) should be substantially free from the presence of polyol, which polyol exists due to the incomplete alkoxylation of the alkyl phenol. To prevent incomplete alkoxylation, anhydrous and polyol-free alkylene oxide must be used.

Among the compounds within the class of component (B) mention may be made of nonylphenoxypoly (ethylene oxy) ethanol, octyphenoxypoly (propylene oxy) propanol dodecylphenoxypoly (butylene oxy) butanol and tertiary butylphenoxpoly (ethylene oxy) ethanol.

I have found that in order to impart antifogging properties to a vinyl film, both components must be present in the composition. From the point of view of strictly antifogging properties in the film, I have found that four (4) parts (about) by weight of composition for one hundred (100) parts of polymeric vinyl resin will result in good non-fogging properties in a film or sheet made from said resin.

The two components can be used in ratios of from 10 parts of component (A) to 90 parts of component (B) to and including 90 parts of component (A) to 10 parts of component (B) in the approximately 4 parts by weight of composition to be added to the 100 parts of film forming resin. The preferred ratios however are 50% (A) : 50% (B) which is a solid at room temperature, and 25% (A) : 75% (B) which is a liquid at room temperature.

While the use of about 4 parts of the composition gives rise to good non-fogging properties in the film-forming material, the use of from about 3 parts to 10 parts per 100 parts of film-forming material is contemplated. The use of high levels, around 9 or 10 parts, may be needed for instance in those instances when a high level of stearic acid is present in the resinous substance.

In actual useage, the anti-fog composition is incorporated into or onto the polyvinyls in an amount which imparts fog resistance to the film and not more than that which does not appear to further improve the anti-fogging properties of the film and/ or not more that that which adversely affects the other normally desired physical characteristics of the films produced therefrom. It has been found that if an excess amount of anti-fog agent is incorporated in the film, it tends to be tacky and has a greasy feel. The blocking and slip properties of the film are also adversely affected. Moreover, an excess of anit-fog agent in the film adversely affects the adhesion of inks thereto.

Optimumly, the concentration of the anti-fog agent in the film will vary with the thickness of the film. Since thinner films have a greater surface area per unit weight of film than do thicker films, a greater concentration of the anti-fog agent will be necessary to produce optimum results in thinner films than that necessary for thicker films. The optimum concentration for each particular thickness of the film can be readily determined by simple empirical tests.

Each of the series of compounds comprising component (A) and each of the series of compounds comprising component (B) have HLB values in the range of from 4 to 14 inclusive. The compositions forming part of this invention also have HLB values within the range of from 4 to 14 inclusive. Anti-fog agents having an HLB value of less than about 4 and more than 14 do not impart optimum properties to the film. Also, mixtures of compounds wherein the HLB value of each constituent is outside the specified range and the HLB value of said mixture is within the specified range, do not give desirable anti-fog properties to the film.

The term "HLB" as used herein is defined in the *Journal of the Society of Cosmetic Chemists* of 1949, pages 311 through 326; and the *Journal of the Society of Cosmetic Chemists* of 1954, pages 249 through 256. Briefly, the term HLB comes from the words "hydrophile-lipophile balance." The HLB method as described in the *Journal of the Society of Cosmetic Chemists* is a method which assigns numerical values to surfactants, thereby providing a system of classification that is related to their behavior and to their solubility in water. The HLB method is based on the premise that all surfactants combine hydrophilic and lipophilic groups in 1 molecule and that the proportion between the weight percentages of these two groups for non-ionic surfactants is an indication of the behavior that may be expected from the product.

The polymeric vinyl material used in the present invention includes polyvinyl chloride and copolymers thereof with polyvinyl acetate. The homopolymer PVC and the copolymers wherein vinyl chloride is present in the majority proportion give satisfactory films for wrapping meats, fish, poultry, produce and the like.

The incorporation of the anti-fog agents in polyvinyl materials to impart thereto resistance to moisture fogging can be effected in several ways. In a preferred embodiment, the anti-fog agent is homogeneously incorporated into the polyolefin by heating them together to at least the melting point of the plastic material in a suitable mixing apparatus, such as a Banbury mixer or heated differential mixing rolls, until a homogeneous mixture is formed, solidifying the mixture by cooling and then comminuting the cooled mixture to a particle size satisfactory for hot-melt extrusion or equivalent heat-shaping operation to form films. It will be obvious to those skilled in the art that other methods can also be used to incorporate the anti-fog agent.

The incorporation of an anti-fog agent in the polyvinyl material is preferred over other methods, such as coating the polyolefin material with the anit-fog agents, for several reasons. First, in using a coating, a need to find an adequate solvent is present. Moreover, as a matter of economics, the anti-fog agent can simply be incorporated in the polyvinyl material by adding it in the processing of the raw polyvinyl material; or by adding it at the time it is ready to form film. On the other hand, the coating containing an anti-fog agent must be applied after the film is formed, thereby necessitating coating and solvent recovery equipment. Thus, overall processing costs are less when the anti-fog agent is incorporated into the polyvinyl. Another important reason for preferring the incorporation of the anti-fog agent is that a coating containing an anti-fog agent may be wiped or washed off the polyvinyl surfaces. Accordingly, the fogresistance of the film is greatly impaired, causing an overall fogged effect to thereafter develop on the polyvinyl film surfaces when employed as in packaging material, as herein described. In contrast, when the anti-fog agent is incorporated in the polyvinyl film, it is generally believed some of the anti-fog agent will remain therein and not migrate to the film surfaces. Thus, when the migrated portion of the anti-fog agent is removed from the film surfaces, that which remains in the film will migrate to the film surfaces. In this manner, the film remains fog resistant, even upon removal of at least the initial portion of the anti-fog agent which has migrated to the film surfaces.

It is seen that the polyvinyl chloride homo and copolymers can have incorporated therein not only the anti-fog compositions of this invention, but also other additives; for instance, plasticizers, i.e., substantially nonvolatile solvents that are chemically inert to the resins, as, for example, di(2-ethylhexyl)adipate, acetyl tributylcitrate, epoxidized soybean oil, butyl phthalyl butyl glycolate, diisobutyl adipate, diphenyl (2-ethylhexyl) phosphate, butyl benzyl phthalate, and the like and mixtures thereof. The total plasticizer concentration in the vinyl film should generally be between about 20–60 parts by weight of plasticizer for 100 parts by weight of vinyl film and preferably between about 30–50 parts.

Other additives to the film composition may include usual stabilizers for polyvinyl chloride films as for example triphenyl phosphate, nonylphenol, barium, cadmium, calcium and zinc salts of lauric and other fatty acids, and mixtures thereof.

There may also be included approved food colors to establish the color desired.

Generally, the polymeric vinyl resin, plasticizer and anti-fogging and anti-tackifying agent are heated and/or subjected to high shear and thus blended. Other additives, such as stabilizers and color modifiers may, be added to the blend. When heat is used in blending, the temperature is such that it is sufficient to provide adequate penetration of the plasticizer and said agent into the vinyl resin. The solution is then extruded, drawn, blown or in any other convenient manner made into a film or sheet. The thickness of the film or sheet can be varied as desired however, I have found that a useful thickness for red meat films is between about 0.1 mil and 2 mils. Thicknesses greater than 2 mils may require additional plasticizer to attain the desired gas permeability rates.

The following table shows proportions of ingredients of the several classes as illustrative of proportions which can be used in the present invention. It is understood that the ranges given in the Table are by way of example and not by way of limitation. The purpose of the Table is to offer constructive assistance in formulating the desired filming form composition. Proportions here and elsewhere herein are expressed as parts by weight on a dry basis unless specifically stated to the contrary.

TABLE I

| Component | Parts by Weight |
| --- | --- |
| Polyvinyl Chloride Homo or Copolymer | 100 |
| Di(2-Ethylhexyl) Adipate | 40 |
| Epoxidized Soybean Oil | 5 |
| Calcium and Zinc Stearate Stabilizer (1 Ca : 1 Zn) | 2 |
| Trisnonylphenyl Phosphate (Chelant) | 0.5 |
| Anti-Fog Composition Glycerol Monococate & Nonylphenoxypoly (ethyleneoxy) Ethanol | 4 |

In the above formulation, the Anti-Fog Composition can contain 10% to 90% (A) component and from 90% to 10% (B) component.

The invention is further illustrated by description in connection with the following specific examples.

EXAMPLE I

A mixture for a polyvinyl chloride film was prepared in the proportions recited in Table I, wherein the anti-fog composition was 25% component (A) and 75% component (B).

The composition was warmed and blended at about 350°F. until the mass was substantially uniform. The heated compound was conveyed to an extruder and made into a film or sheet approximately 1.0 mil thick. The film had excellent anti-fogging and thermal stability properties.

EXAMPLE II

The procedure and composition of Example I are used except that the polyvinyl chloride resin is replaced by 100 parts of a copolymer or 90% vinyl chloride and 10% vinyl acetate. Film thickness is approximately 2 mil.

EXAMPLE III

The procedure and composition of Example I were repeated except that the anti-fog composition was 59% component (A) and 50% component (B).

EXAMPLE IV

The procedure and composition of Example I are used except that the polyvinyl chloride is replaced by 100 parts of a mixture of 90 parts of polyvinyl chloride and 10 parts of polyvinylacetate, and the anti-fog composition is 50% component (A) and 50% component (B) film thickness is approximately 2 mil.

Examples II to IV have the anti-fogging, and thermal stability properties of the compound of Example I.

The anti-fogging property of the films is measured quantitatively by, covering a 250 c.c. beaker which contains about 120 c.c. of distilled water at 120°F, with a sample of the film, securing the film to the beaker, tipping the beaker approximately 90°, such that about one-half of the surface area of the film covering the beaker is contacted by the water whereby a fog is formed in the contacted area, returning the beaker to an upright position, and noting the time required for the contacted fogged area to clear itself due to the presence of the anti-fog composition in the film.

Blocking properties are evaluated by visual observation and feel of the polymer film.

Since certain changes may be made in the above products and compositions without departing from the scope of the invention herein involved, it is intended that all matter contained in the above description shall be interpreted as illustrative and not in a limiting sense.

What is claimed is:

1. A film-forming composition comprising a homogeneous mixture of a polyvinyl polymer selected from the group consisting of polyvinyl chloride homopolymers and vinyl chloride-vinyl acetate copolymers, and an effective amount of an anti-fog composition to impart resistance to moisture fogging, said anti-fog composition comprising the two components:
   A. a partial ester of a water soluble $C_{2-6}$ polyol with a $C_{6-18}$ aliphatic monocarboxylic acid, and
   B. an alkoxylated alkylphenol.

2. The film forming composition of claim 1 wherein the polymer is polyvinyl chloride.

3. The film forming composition of claim 1 wherein the polymer is a copolymer of vinyl chloride and vinyl acetate.

4. The film forming composition of claim 2 wherein the ratio of the two components of the anti-fog composition is 25% (A) and 75% (B).

5. The film forming composition of claim 2 wherein the ratio of the two components of the anti-fog composition is 50% (A) and 50% (B).

6. The film forming composition of claim 3 wherein the ratio of the two components of the anti-fog composition is 25% (A) and 75% (B).

7. The film forming composition of claim 3 wherein the ratio of the two components of the anti-fog composition is 50% (A) and 50% (B).

8. A transparent polyvinyl chloride film having incorporated therein as an anti-fog agent an effective amount of a composition comprising glycerol monococate and nonylphenoxypoly (ethylene oxy) ethanol.

9. A transparent vinyl chloride-vinyl acetate copolymer film having incorporated therein as an anti-fog agent an effective amount of a composition comprising glycerol monococate and nonylphenoxypoly (ethylene oxy) ethanol.

10. A package which contains a water emitting material and which is formed of a polyvinyl film selected from the group consisting of polyvinyl chloride and vinyl chloride -vinyl acetate copolymer, having dispersed therein an anti-fog composition in an amount imparting resistance to moisture fogging, said composition comprising:

A. a partial ester of a water soluble $C_{2-6}$ polyol with a $C_{6-18}$ aliphatic mono-carboxylic acid, and
B. an alkoxylated alkylphenol.

11. A film comprising in major proportions plasticized vinyl resin, said vinyl resin being selected from the group consisting of polyvinyl chloride and vinyl chloride-vinyl acetate copolymers, and in minor proportions an antifogging agent, said agent being a combination of (A) an alkoxylated alkyl phenol prepared by condensation of 1 mole of alkyl phenol with 1–9 moles of a $C_{2-4}$ alkylene oxide and (B) a partial ester of a water soluble $C_{2-6}$ polyol with a $C_{6-18}$ aliphatic monocarboxylic acid, the amount of (A) and the amount of (B) each being from about 0.3 to 9 parts by weight, and the amount of (A) plus (B) being from about 3 to 10 parts by weight, said amounts being parts by weight for each 100 parts by weight of vinyl resin.

12. An anti-fogging composition comprising (A) an alkoxylated alkyl phenol prepared by condensation of 1 mole of alkyl phenol with 1–9 moles of a $C_{2-4}$ alkylene oxide and (B) a partial ester of a water soluble $C_{2-6}$ polyol with a $C_{6-18}$ aliphatic monocarboxylic acid, the amount of (A) and the amount of (B) each being from about 0.3 to 9 parts by weight.

13. An anti-fogging composition which comprises (A) a partial ester of a water soluble $C_{2-6}$ polyol with a $C_{6-18}$ aliphatic monocarboxylic acid, and (B) an alkoxylated alkylphenol.

14. The anti-fogging composition of claim 13 wherein the ratio of the two components of the anti-fog composition is 25% (A) and 75% (B).

15. The anti-fogging composition of claim 13 wherein the ratio of the two components of the anti-fog compositions is 50% (A) and 50% (B).

* * * * *